(12) United States Patent
Bansal

(10) Patent No.: US 7,895,559 B2
(45) Date of Patent: Feb. 22, 2011

(54) METHOD FOR DESIGNING STRUCTURED ASICS IN SILICON PROCESSES WITH THREE UNIQUE MASKING STEPS

(75) Inventor: Jai P. Bansal, Manassas, VA (US)

(73) Assignee: BAE System Information and Electric Systems Integration Inc., Nashua, NH (US)

( * ) Notice: Subject to any disclaimer, the term of this patent is extended or adjusted under 35 U.S.C. 154(b) by 282 days.

(21) Appl. No.: 12/218,672

(22) Filed: Jul. 17, 2008

(65) Prior Publication Data

US 2008/0282216 A1 Nov. 13, 2008

Related U.S. Application Data

(62) Division of application No. 11/147,024, filed on Jun. 7, 2005, now Pat. No. 7,418,692.

(60) Provisional application No. 60/578,371, filed on Jun. 9, 2004.

(51) Int. Cl.
*G06F 17/50* (2006.01)
(52) U.S. Cl. .................. 716/116; 716/106; 257/211; 326/40; 326/41; 438/128; 438/129
(58) Field of Classification Search .............. 716/106, 716/116; 257/211; 326/40–41; 438/128–129
See application file for complete search history.

(56) References Cited

U.S. PATENT DOCUMENTS

| | | | | | |
|---|---|---|---|---|---|
| 5,038,192 | A | * | 8/1991 | Bonneau et al. | 257/206 |
| 5,217,916 | A | * | 6/1993 | Anderson et al. | 438/128 |
| 5,691,218 | A | * | 11/1997 | Colwell et al. | 438/128 |
| 5,703,789 | A | * | 12/1997 | Beausang et al. | 716/4 |
| 5,731,223 | A | * | 3/1998 | Padmanabhan | 438/125 |
| 5,858,817 | A | * | 1/1999 | Bansal | 438/129 |
| 6,061,814 | A | * | 5/2000 | Sugasawara et al. | 714/724 |
| 6,173,435 | B1 | * | 1/2001 | Dupenloup | 716/18 |
| 6,226,782 | B1 | * | 5/2001 | Nowak et al. | 716/19 |
| 6,331,790 | B1 | * | 12/2001 | Or-Bach et al. | 326/41 |
| 6,445,065 | B1 | * | 9/2002 | Gheewala et al. | 257/691 |
| 6,532,581 | B1 | * | 3/2003 | Toyonaga et al. | 716/11 |
| 6,580,289 | B2 | * | 6/2003 | Cox | 326/40 |
| 6,765,245 | B2 | * | 7/2004 | Bansal | 257/202 |
| 6,823,499 | B1 | * | 11/2004 | Vasishta et al. | 716/7 |
| 6,829,750 | B2 | * | 12/2004 | Maki et al. | 716/3 |
| 7,030,651 | B2 | * | 4/2006 | Madurawe | 326/41 |
| 7,084,666 | B2 | * | 8/2006 | Madurawe | 326/38 |
| 2002/0186045 | A1 | * | 12/2002 | Cox | 326/41 |
| 2003/0034795 | A1 | * | 2/2003 | Otto et al. | 326/16 |
| 2003/0178648 | A1 | * | 9/2003 | Bansal | 257/202 |
| 2005/0251775 | A1 | * | 11/2005 | Wood | 716/10 |

* cited by examiner

*Primary Examiner*—Naum B Levin
(74) *Attorney, Agent, or Firm*—Mark A. Wurm

(57) ABSTRACT

A multi-function core base cell includes a set of functional microcircuits. These microcircuits are used to design a Library of Logic Function Macros. The functional macros consisting of one or more microcircuits have a fixed and complete physical layout similar to a conventional standard cell library macro set. In addition to a core functional macro set, primary input/output buffers and commonly used single and dual port memory blocks are also defined in the library. The library includes all the ASIC synthesis, simulation, and physical design rules.

15 Claims, 7 Drawing Sheets

US 7,895,559 B2

METHOD FOR DESIGNING STRUCTURED ASICS IN SILICON PROCESSES WITH THREE UNIQUE MASKING STEPS

CROSS REFERENCE TO RELATED APPLICATIONS

This application claims priority to and is a divisional of application Ser. No. 11/147,024 filed Jun. 7, 2005, now U.S. Pat. No. 7,418,692, which issued on Aug. 26, 2008, which in turn claims priority to prior U.S. Provisional Application No. 60/578,371, entitled A Method for Designing Structured ASICS in Silicon Processes with Three Unique Masking Steps, filed Jun. 9, 2004, both the patent and the applications are incorporated herein in their entirety for all purposes.

TECHNICAL FIELD

Various embodiments of the invention relate to the design and fabrication of application specific integrated circuit (ASIC) devices, and in particular, but not by way of limitation, to a method of ASIC design and fabrication with three unique masking steps per ASIC part.

BACKGROUND

A general function ASIC device consists of logic functions such as combinatorial circuits, latches and registers, memory blocks, input/output buffers, and other custom functions. In the prior art, logic functions are derived from a configurable logic block (CLB) in the same manner as these functions are configured in Field Programmable Gate Array (FPGA) devices, except interconnections are made in a semiconductor process line with reduced masking steps. One example of such a CLB is shown in FIG. 1. It consists of a 4:1 multiplexer and a DFF with scan. Two input Boolean logic functions are generated from the 4:1 multiplexer. Different combinatorial functions are generated from the 4:1 multiplexer by connecting inputs D0 to D3 to a power supply (VDD) or ground (GND) while real signal inputs are applied to input In1 and input In2. A truth table of a two way NAND function configured with a CLB in the prior art is also given in FIG. 1. Any delay and power dissipation of these logic functions are caused by the multiplexer and not the actual logic functions. Configured logic functions from CLBs use many more circuits to implement a logic function compared with the method of achieving logic functions in the conventional Gate Array or Standard Cell ASIC design methodologies. This results in lower performance and/or higher power dissipation of the ASIC devices. In the prior art, structured ASIC design requires a special EDA (Event Driven Architecture) software system specially tailored to a designer's methodology.

The art is therefore in need of a less complex and more flexible process to manufacture ASIC devices.

DETAILED DESCRIPTION

Figure 1:
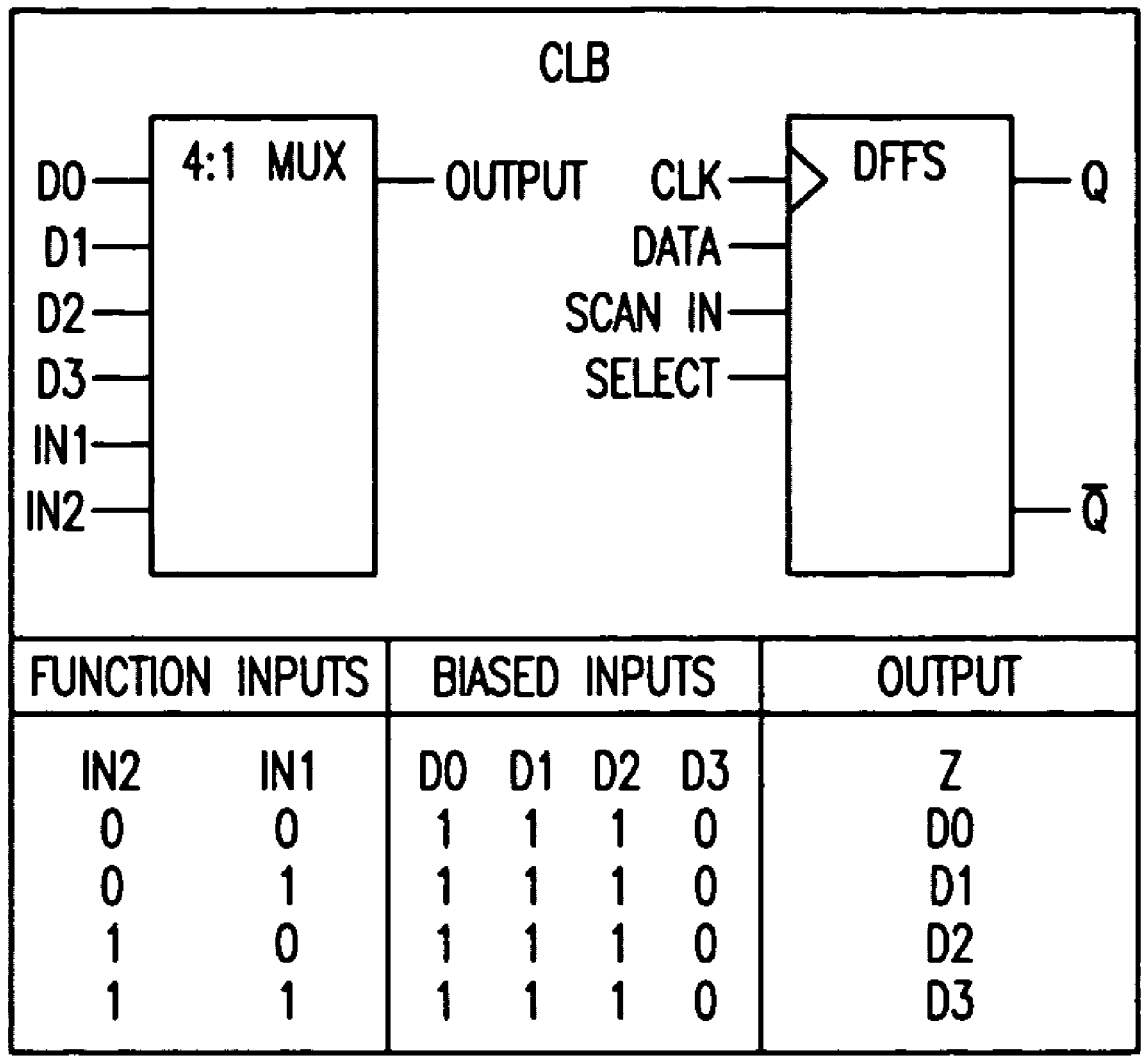
FIG. 1 illustrates an example of a configurable logic block that is known in the art.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment, a multifunction core base cell is defined. As will be described infra, the core base cell consists of a set of functional microcircuits. These microcircuits are used to design a Library of Logic Function Macros. The functional macros consist of one or more microcircuits having a fixed and complete physical layout similar to a conventional standard cell library macro set. In addition to the core functional macro set, primary input/output buffers and commonly used single and dual port memory blocks are also defined in the library. The library includes all the ASIC synthesis, simulation, and physical design rules.

An architecture of a chip image is defined. The chip has an optimum area defined for rows and columns of the core base cells, memory blocks, input and output buffers and other custom logic functions. The chip image layout with all these functions in place is known as the masterslice. This masterslice is used to design and fabricate a family of ASIC devices. All mask levels, except masks for metal level M3, metal level M4, and V3 (interconnection between metal levels M3 and M4) are common for all the ASICs designed using this masterslice. That is, as will be described infra, M3, V3, and M4 are the only unique masks per unique ASIC part. One or more of these partially preprocessed wafers through a V2 process step are used to complete the fabrication of an ASIC device. Therefore, fabrication of an ASIC device is started with masterslice wafers already pre-processed up to the deposition of M3 from stock. Actual wafer process procedure is a well known prior art and is not further described.

Flexibility of auto placement and auto routing with EDA tools in this design method is the same as that of designing ASICs with the conventional Standard Cell ASIC design systems, while the mask cost and fabrication time is greatly reduced from the conventional methodology.

Core Base Cell

Figure 2:
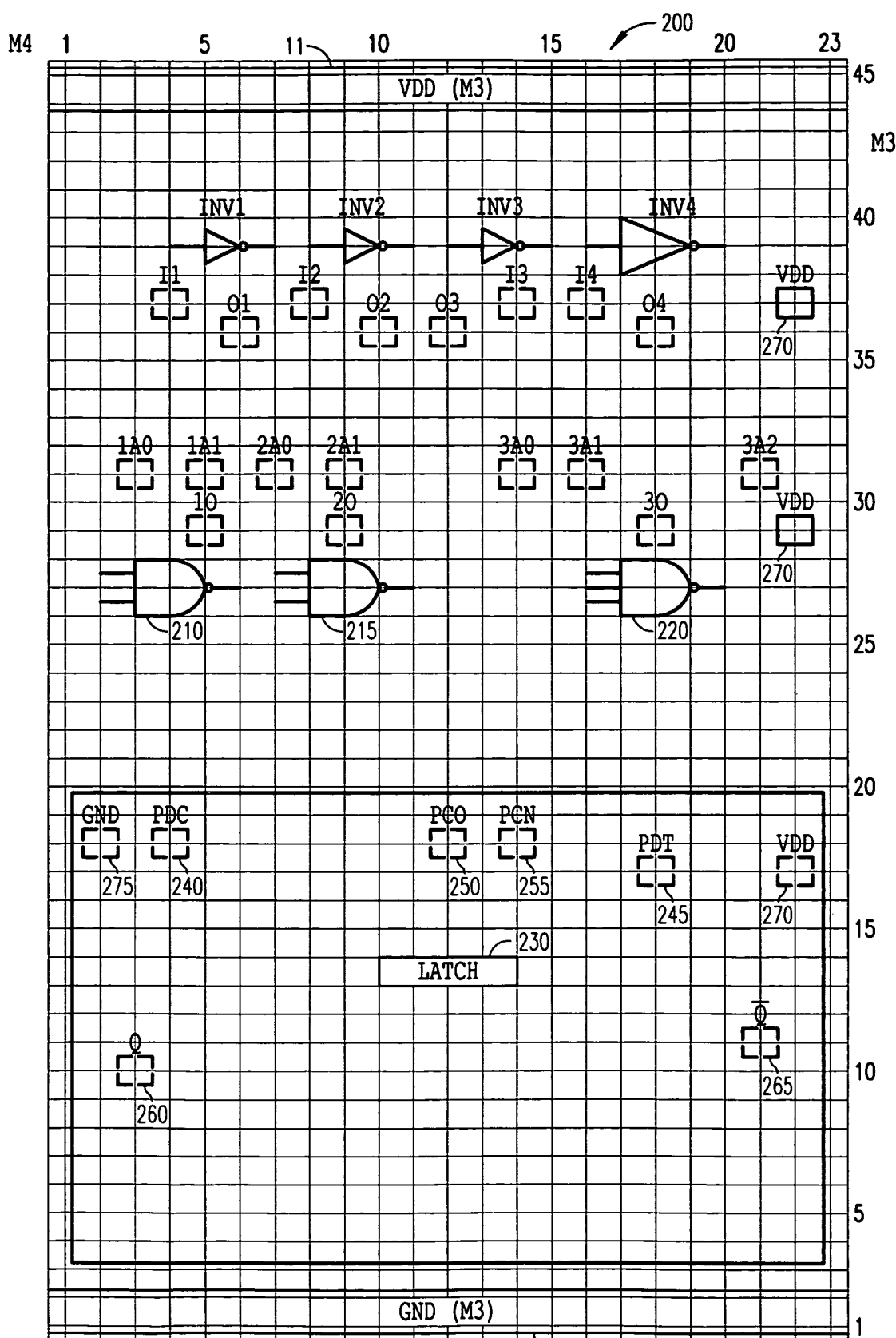
FIG. 2 illustrates an example embodiment of a multifunction core base cell.

FIG. 2 illustrates a multifunction core base cell 200. The core base cell includes microcircuits, inputs and outputs. At the M3 and M4 levels, there is a wiring grid (of electrical connection paths) in the X/Y direction. In the embodiment of FIG. 2, this grid consists of 45 wires in the X direction and 23 wires in the Y direction. The base cell 200 has three 1× inverters, INV1, INV2, INV3, and one 3× inverter INV4. The notation 1× indicates that the circuit can meet performance objectives when driving one unit of external capacitance load. The inverter INV4 with 3× driving strength is used as an INV_3× (inverter with 3× driving strength) as well as an output buffer for other logic functions. As illustrated in FIG. 2, the inputs and outputs of the four inverters INV1, INV2, 3, and INV4 are I1, O1, I2, O2, I3, O3, I4, and O4 respectively. The Base cell also includes two, two way NAND functions 210 and 215 (referred to collectively as NAND2), and one, three way NAND (will be referenced as NAND3) function 220. The inputs and outputs of the NAND circuits are marked as 1A0, 1A1, 10, 2A0, 2A1, 20, 3A0, 3A1, 3A2 and 30.

Since normally less than 15 percent of the logic macro functions in an ASIC device are registers, it is more efficient for the circuit density of the chip to include only half of a DFF register in the base core cell. A register macro function then will take two base core cells. Another microcircuit in the base cell is a latch function 230—half of a DFF register. A latch function is used to implement DFF, DFFS, and other register functions. As illustrated in FIG. 2, the inputs and outputs of the latch circuit are a PDC 240 (complement data input), PDT 245 (true data input), PC0 250 (true clock input), PCN 255 (complement of clock), VDD 280 and GND 285, Q 260, and QBAR 265 (true and complement) outputs of the latch 230. FIG. 2 further illustrates that the core cell 200 also includes VDD pins 270 and GND pin 275 brought to metal level M3. The VDD and GND pins are used to bias the unused inputs of the microcircuits. This biasing ensures that the unused microcircuits or an unused part of the microcircuits do not switch due to coupling noise and dissipate unnecessary power or create any other reliability problem in the ASIC device. All input/output pins of the microcircuits, VDD, and GND are brought to the metal M3 level in the core base cell layout. The core base cell shows the VDD bus 11 and GND bus 12 are also brought to metal level M3. The input and output pins of the microcircuits are placed on the X, Y wiring grid. Location of these pins is selected to minimize the wiring tracks taken up by the personalities of the various library logic functions and leaving more than 80 percent of the wiring tracks at M3 and M4 for macro to macro wiring, also known as global wiring.

All microcircuit inputs connected to the transistor gate terminals are connected to diodes formed with N+ diffusion to P_substrate. Since the P_substrate is connected to the ASIC ground, these diodes get reverse biased. These diodes prevent thin oxide of the transistors from getting damaged during the wafer process by the electrostatic charge accumulating on the thin silicon oxide terminal. This is an early solution for the problem known as Antenna Rules requirements in the design of the conventional Standard Cell ASICs.

The physical layout of the microcircuits at the transistor level, and the interconnections of the transistors to form the microcircuit functions, are well-known among those of skill in the art, and will not be further described.

Library Logic Functions and their Layout Design

A difference between the design of library logic function macros in embodiments of the invention and the design of the library logic functions in the prior art is that the macro functions in an embodiment of the invention have the same optimum design characteristics as those in the conventional Standard Cell libraries. Logic function macros consist of just the circuits needed to do the logic function, whereas in the prior art of structured ASIC design, logic function macros are configured from multi-purpose FPGA (Field Programmable Gate Array) types of CLBs, which result in additional decode circuits needed to direct the signal path through these CLBs.

Unused input pins of the microcircuits are connected to VDD or GND pins to bias the unused microcircuits in a steady state, a state in which no current flows through the unused transistors. Delay and power dissipation associated with each of the macros is that of the logic function used in the ASIC design and not of the configurable logic blocks (CLBs) in the prior art. For many functions, delay and power dissipation of the CLBs is several times more than that of the needed logic function. Examples of some of the library logic functions designed in this invention are given in Table 1 below.

In different embodiments, the logic function macro may be as simple as an inverter with a 1× drive (INV_1×), or it may be a more complex logic function macro such as a DFF with Scan and Asynchronous Reset (DFFSAR_1×). In the several embodiments, most logic function macros in the library have multiple driving strengths to achieve optimum power performance characteristics at the ASIC level.

The variety of logic function macros that can be designed using the microcircuits of the core base cell far exceeds the functions that can be configured from the CLBs in the prior art. This comprehensive set of logic function macros provides performance and power dissipation characteristics comparable to the conventional Standard Cell designs.

TABLE 1

Examples of logic function macros in the library

| Logic Macro Name | Driving Strengths | Core Base Cells used |
|---|---|---|
| INVERTER | 1X to 6X | 1 |
| NAND2 | 1X, 2X, 4X | 1 |
| AO21, AO22, AO221 | 1X, 2X, 4X | 1 |
| DFF w/Asynch Reset or Set | 1X, 3X | 2 |
| DFFS w/Scan & Asynch Reset | 1X, 3X | 2 |
| MUX2, XOR2, XNOR2 | 1X, 3X, 4X | 1 |
| Input/Output Buffer Cell | 1X, 2X | 1 I/O Cell |

Logic Function Macro Design

As earlier stated, the macros' functions may be as simple as an inverter, a NAND, or a NOR, or as complex as a DFF with scan and asynchronous pre-set, a FULL Adder, or a decode DE-CODE. For some of the simple macro functions, microcircuits of equivalent logic functions are used one to one. For example, microcircuit inverter INV1 when used as an inverter macro with 1× drive becomes INV_1× in the library. At the macro level, input and output of the inverter are given global names like PA0 and P10 (See FIG. 3). All other circuits in the base cell are biased to steady state.

Similarly a NAND2 or a NAND3 microcircuit can satisfy the design of a NAND2_1× or a NAND3_1× respectively. Global input and output names of the logic function macros are different than those of the microcircuit names.

In several embodiments, a NAND2 macro with 2× driving strength is designed by connecting the inputs and outputs of the NAND2 microcircuits in parallel. A 4× BUFFER circuit is designed using two 1× inverters in parallel driving a 4× inverter (1× and a 3× inverters in parallel). A NAND2 macro with 4× driving strength is designed by driving output of the NAND2_1× microcircuit with a 4× BUFFER made up with inverters as described above. In all these cases and other complex macros, only the necessary microcircuits are used that are needed to do a particular logic function. Unused microcircuits are biased to a known steady state and thus no unnecessary power is dissipated.

Figure 3:
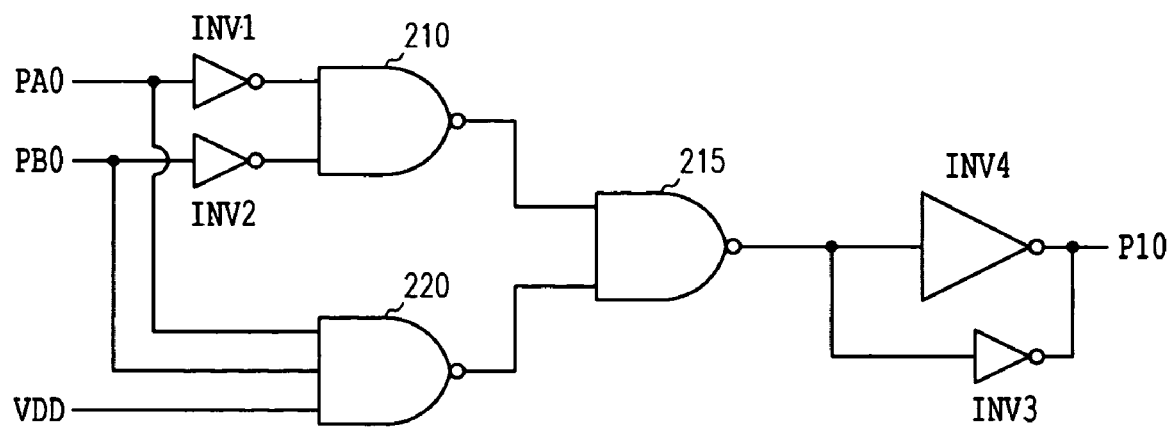
FIG. 3 illustrates an example embodiment of a circuit diagram of a combinatorial logic function.
Figure 4:
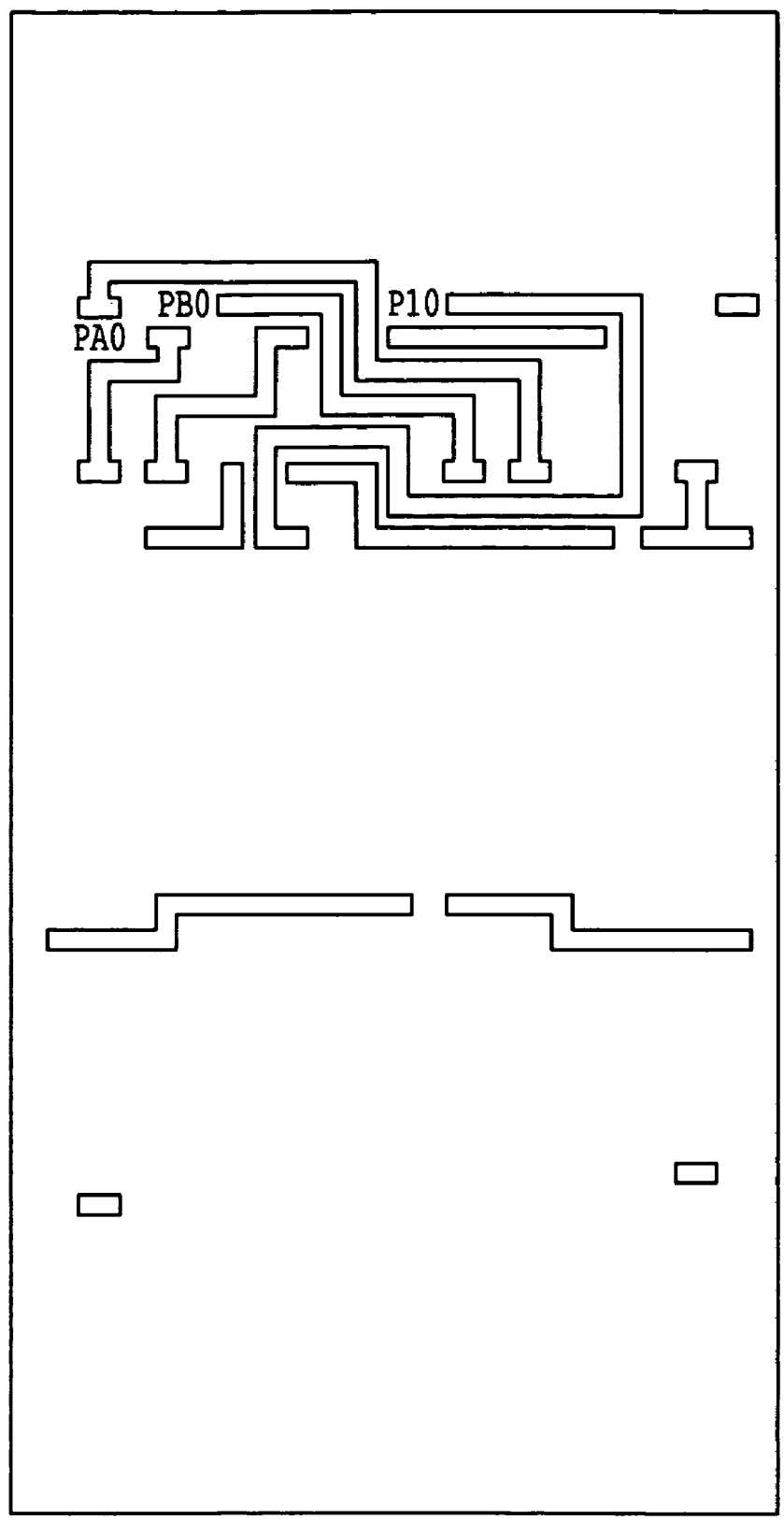
FIG. 4 is an example layout of a personality of an exclusive OR logic macro function over a core base cell.

An example of a more complex macro function is a two-way Exclusive OR function with 4× driving strength. In the library such a macro function may be referred to as XOR2__4×. An example embodiment of an Exclusive OR Macro function configured with microcircuits is illustrated in FIG. 3. This is another example of logic function macros that can be configured by interconnecting microcircuits in the base cell. The circuit of FIG. 3 can drive four units of external capacitance load (capacitance of circuits and wiring connected to the output of the XOR macro) and still meet performance objectives. Microcircuits, Inverters and NAND circuits are interconnected at metal level M3 as shown in the personality of the macro XOR2__4× illustrated in FIG. 4, wherein a complete layout of XOR2 has its own inputs and output pins marked as PA0, PB0 and P10. Inputs of the microcircuit latch are connected to VDD and GND in such a way that the transistors of the latch circuit and the outputs Q and QBAR stay in the steady state and do not draw any current from the power supply VDD.

The design of the macro XOR2__4×, consisting of all process levels up to metal level M3, may be saved in the Library's graphics (GDS) database under a particular cell name such as XOR2__4×. Global input and output pin names, such as PA0, PB0, and P10, are respectively assigned in the layout of the macro. These signal pins are the only signal pins connected to other logic function macros, as described by the ASIC gate level net list. In an embodiment, the XOR2__4× macro function is implemented in one core base cell. In other embodiments, implementation of some logic functions may take two or more base cells.

Figure 5:
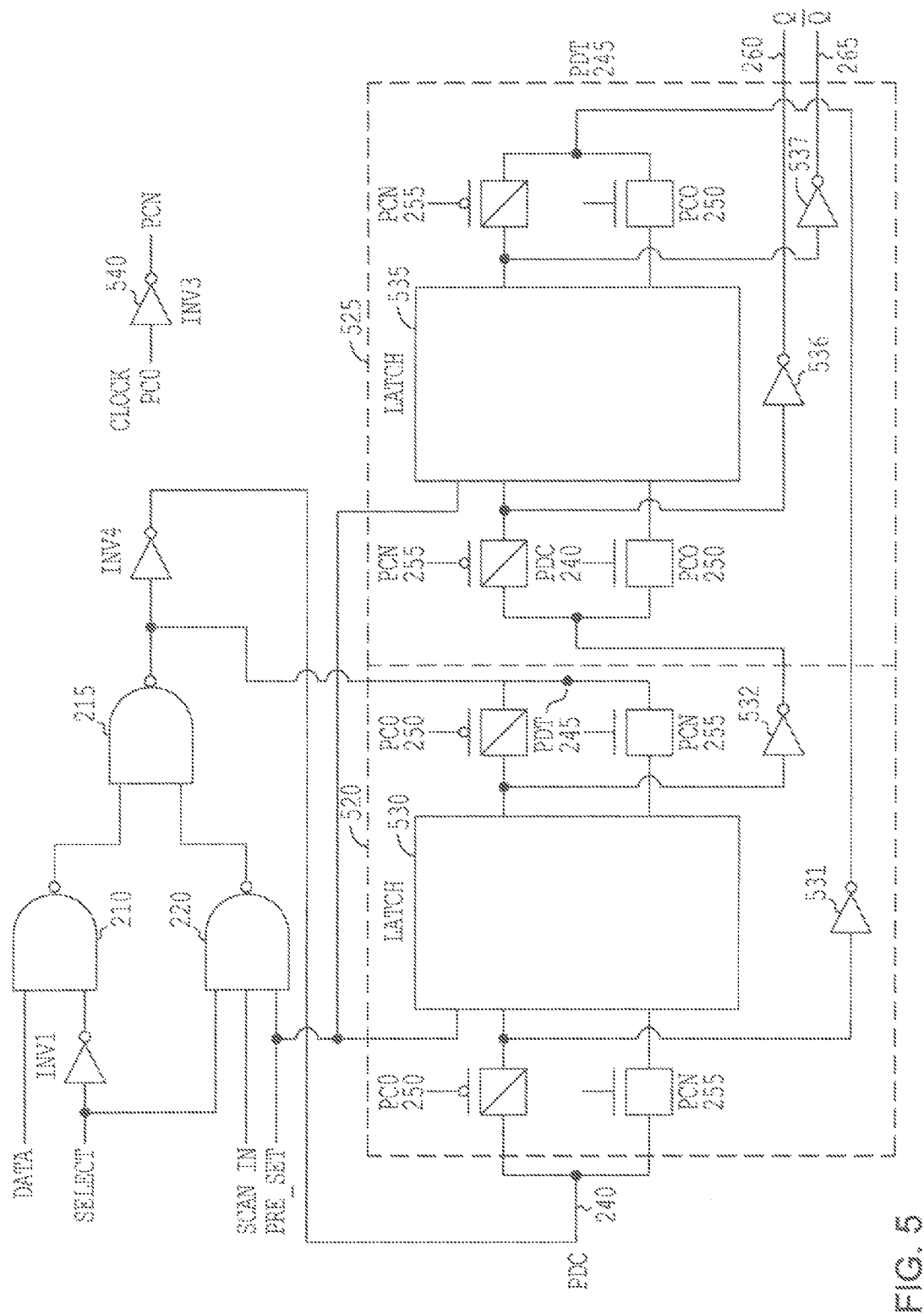
FIG. 5 is an example circuit diagram of a DFF with Scan and asynchronous pre-set (DFFSAS).
Figure 6:
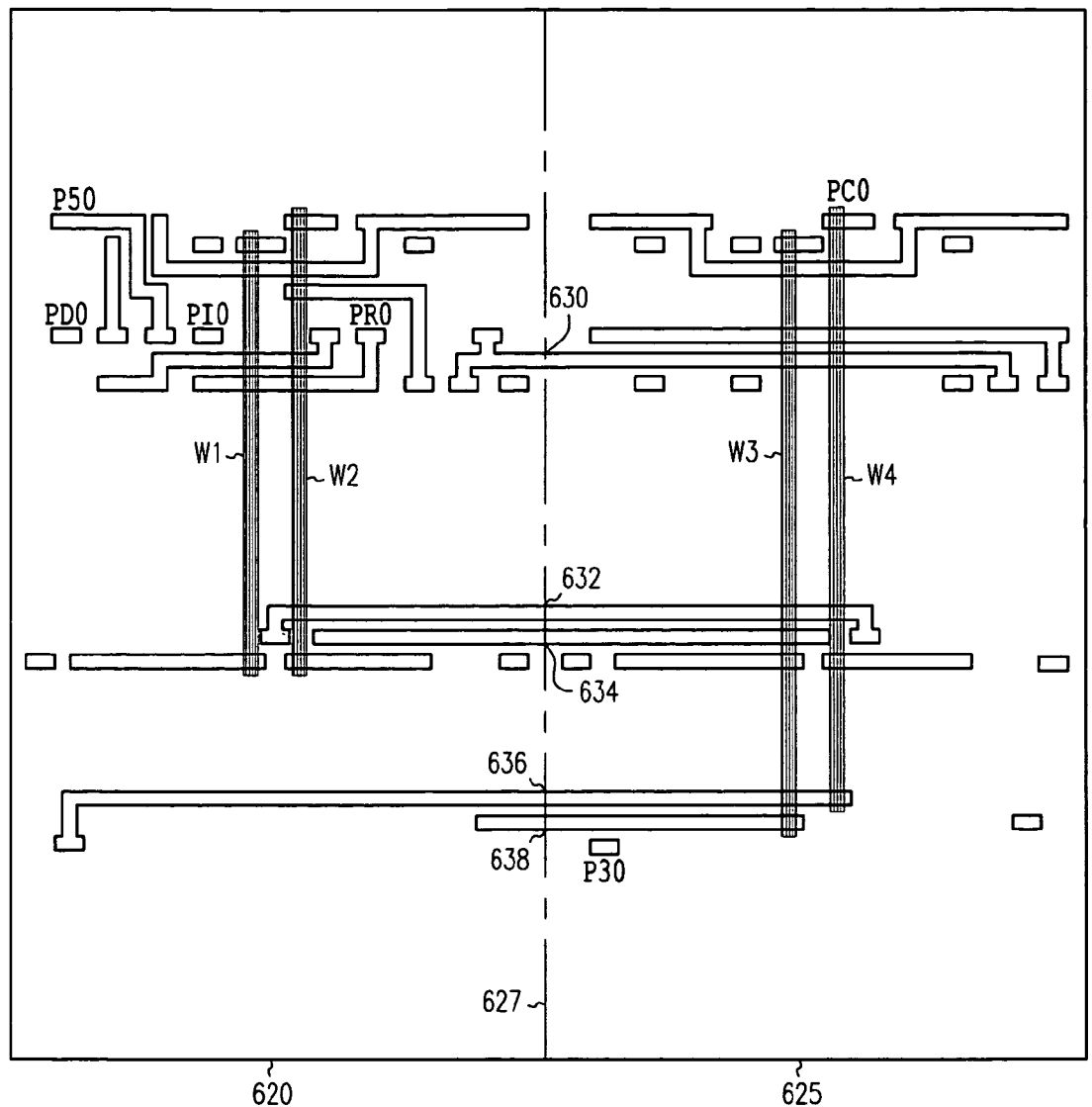
FIG. 6 is an example layout of a personality of the logic macro function DFFS over two adjacent core base cells.

FIG. 5, which is a function which is implemented in two adjacent core base cells 520 and 525, shows the logic diagram of another very common logic function macro—DFF with Scan and Asynchronous pre-set features. As shown in the logic diagram, this function needs two latches 530 and 535, and it takes the two adjacent base cells to implement this function. Inverters 531 and 532 form part of the latch 530, and inverters 536 and 537 form part of the latch 535. The 2:1 multiplex function is implemented with the inverters (INV1, INV3, INV4) and NAND microcircuits 210, 215, 220 in the base cell_1. True and complement of the clock 540 are generated with inverter INV3 in base cell_2. The design layout of this function macro is shown in FIG. 6, and may be given a unique cell name such as DFFSAS__1×. In the design of DFFSAS__1×, two base cells 620 and 625 are placed horizontally next to each other with their boundaries butted against each other at 627. Microcircuits of the two cells are interconnected according to the logic diagram in FIG. 6 at points 630, 632, 634, 636, and 638. All interconnecting metal wires are at metal level M3, except wires W1 to W4 are at metal level M4. The completed layout of the DFFSAS__1× is saved in the Library's GDS database.

Layouts of all the library logic function macros are created and saved in the GDS database or similar database with unique cell names for each macro function. Each driving-strength of each function is also given a unique name. All these logic function designs use the same base cell up to the metal level M2 and Vias V2 (M2 to M3 Vias).

Input and Output (I/O) Buffer Macros

An I/O cell is defined to implement I/O buffer logic functions. Transistors to implement these functions are interconnected up to metal level M2. Functions like Receiver, Driver, Transceiver, Receiver with Pull-up, or Receiver with Pull-down can be completed with metal level M3 only, using the partially pre-wired I/O base cell. Circuits in the unused I/O buffer cells are biased to steady state. I/O cells also include Electrostatic Discharge (ESD) protection devices.

Single and Dual Port Memory Blocks

ASIC device functions consist of combinatorial logic, registers, memory blocks, special functions (e.g. phase lock loops), and I/O buffers. In the masterslice for designing a family of structured ASIC chips, area is divided between logic, memory, special functions and I/O buffers. The number and types of memory blocks are selected to meet as many applications as possible. Very often large memory functions are configured from smaller memory blocks available in the masterslice. For example, a 2K×9 SRAM memory function can be configured from two 1K×9 SRAM memory blocks. At the ASIC level, routing to and from memory blocks will be done at metal levels M3 and M4 only. Unused memory blocks and unused parts of memory blocks are biased to a steady state.

Design of a Masterslice for Structured ASICs

Figure 7:
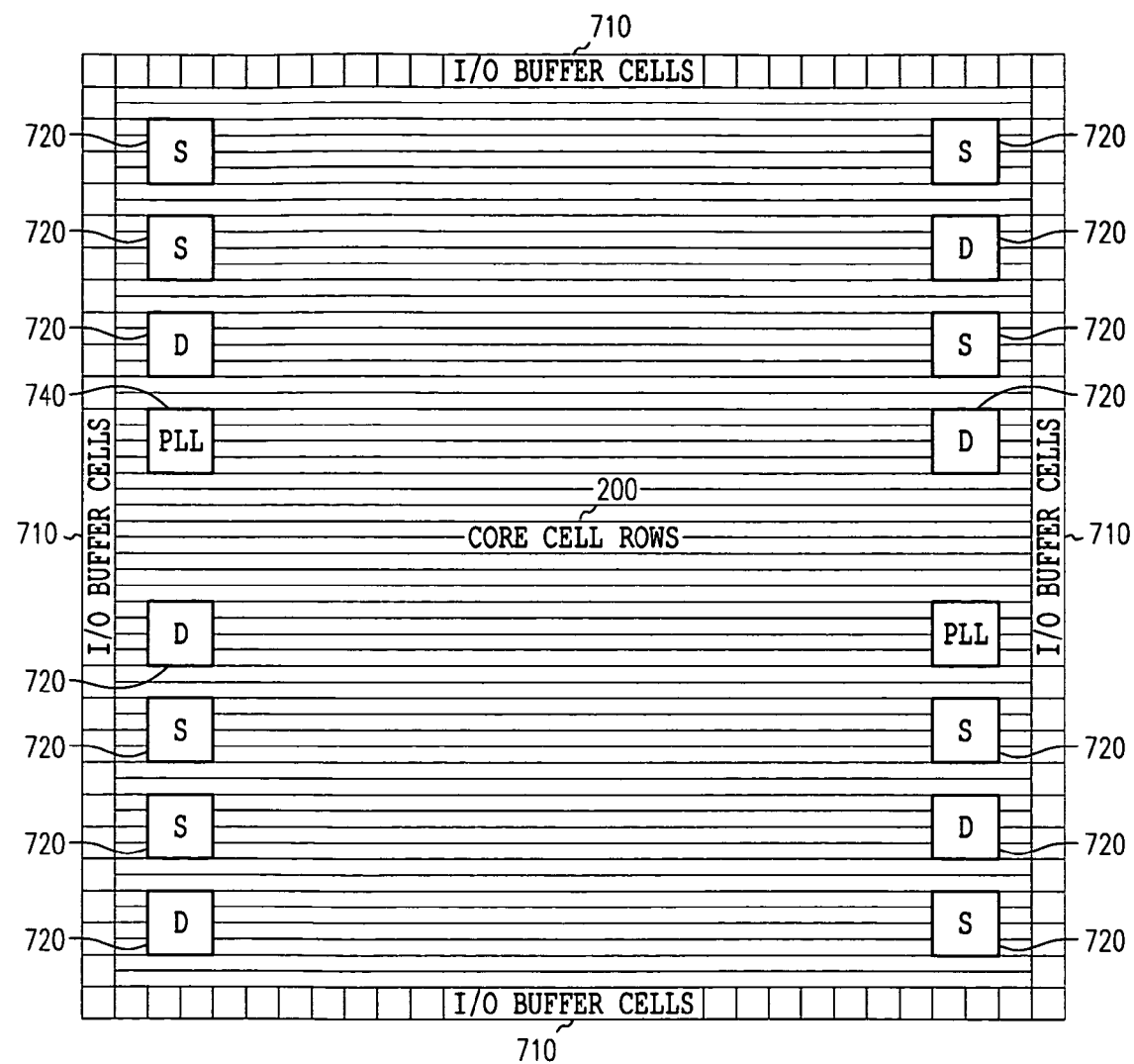
FIG. 7 illustrates an example floor plan of a masterslice that may be used for designing a family of ASIC devices.

A chip size is selected to meet circuit density for a family of ASIC devices, in terms of logic, memory, and I/O buffers. A floorplan of a masterslice is shown in FIG. 7. In FIG. 7, I/O buffer cells 710 are placed along the periphery of the chip. Memory blocks 720 are placed next to the I/O buffer cells leaving some space for routing in between. The remaining area on the chip is filled with core base cells in rows and columns of the base cells. The memory blocks 720 may be either single port RAMS, as indicated by the letter "S" in FIG. 7, or dual port RAMS, as indicated by the letter "D" in FIG. 7. A phase lock loop 740 corrects any delays in a clock which drives the chip. The placement of all the functional cells makes up the masterslice. All design layouts up to V2 (between M2 and M3) will be common to all ASICs designed using this masterslice. Input and output pins of all function macros are brought to metal level M3 in the design. Also common to all ASIC devices designed with this masterslice is metal level M5. M5 is used for VDD and GND distribution from chip pads to metal level M4. M5 also connects I/O Buffers' output pins to chip signal pads.

Structured ASIC Design and Fabrication

A structured ASIC library database consists of simulation, timing, and graphics data for each logic function macro under its own unique name in the same manner as library database for conventional Standard Cell ASIC design does. Since the ASIC design library and other database created in this invention is in the same format as the database for conventional cell based ASIC design systems, physical design of the structured ASIC devices can be done in the conventional cell based ASIC design methodologies, except the routing is done only at metal levels M3 and M4.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. An application specific integrated circuit (ASIC) device comprising:
    a core base cell comprising a plurality of semiconductor components interconnected by a first, second and third metal level having insulating layers therebetween;
    a first metal level masked on said core base cell, said first metal level comprising a common mask to all ASIC devices for completing the ASIC device;
    a second metal level masked through a common first via level mask through an insulating level deposited over said first metal level, said second metal level comprising a common mask;
    a third metal level masked through a common second via level mask through an insulating level deposited over said second metal level, said third metal level comprising a first unique mask;
    a third via level masked through an insulating level deposited over said third metal level, said third via level mask comprising a second unique mask; and
    a fourth metal level masked on said third via level, said fourth level mask being a third unique mask to each of said semiconductor components for completing the ASIC device;
    thereby completing the personalization of an ASIC device using only three unique masking levels.

2. The ASIC device of claim 1, wherein said third level comprises logic function personality and a wiring grid in an X-Y direction.

3. The ASIC device of claim 2, wherein said first common mask comprises inputs into said first level from said core base cell, and outputs from said first level to said second level.

4. The ASIC device of claim 3, wherein said second common mask comprises inputs into said second level from said first level, and outputs from said second level to said third level.

5. The ASIC device of claim 3, wherein said third unique mask and said wiring grid comprise inputs into said third level from said second level, and outputs from said third level to said fourth level.

6. The ASIC device of claim 3, further comprising VDD and GND pins in said first level, said VDD and said GND pins for biasing said inputs that are unused in said device into steady state, thereby preventing current from flowing through said unused inputs.

7. The ASIC device of claim 1, further comprising:
    a microcircuit chip comprising a plurality of said core base cells formed thereon;
    input and output buffers positioned along a periphery of said microcircuit chip; and
    memory blocks positioned along said periphery of said microcircuit chip.

8. The ASIC gate device of claim 7, wherein said core base cells are configured to provide an inverter, said inverter comprising a driving strength of from 1× to 6×.

9. The ASIC device of claim 8, wherein said core base cells are configured to provide a multiplexer, an exclusive OR, or an exclusive NOR, said multiplexer, said exclusive OR, or said exclusive NOR comprising a driving strength of 1×, 3×, or 4×.

10. The ASIC device of claim 7, wherein said core base cells are configured to provide a NAND gate, said NAND gate comprising driving strengths of 1×, 2× or 4×.

11. The ASIC device of claim 7, wherein said core base cells are configured to provide a first input to said NAND gate, a second input to said NAND gate, and an output from said NAND gate, said first input to said NAND gate, said second input to said NAND gate, and said output from said NAND gate comprising driving strengths of 1×, 2×, or 4×.

12. The ASIC device of claim 7, wherein said core base cells are configured to provide a DFF with asynchronous set/reset, said DFF comprising a driving strength of 1× or 3×.

13. The ASIC device of claim 7, wherein said core base cells are configured to provide a DFFS with scan and asynchronous reset, said DFFS comprising a driving strength of 1× or 3×.

14. The ASIC device of claim 1, wherein the semiconductor components comprise:
    a first inverter, a second inverter, a third inverter and a fourth inverter;
    a first two input NAND gate and a second two input NAND gate;
    a three input NAND gate; and
    a latch circuit.

15. The ASIC device of claim 14, wherein said first inverter, said second inverter, and said third inverter comprise a 1× inverter;
    said fourth inverter comprises a 3× inverter;
    said first NAND gate comprises a two input NAND gate;
    said second NAND gate comprises a two input NAND gate; and
    said third NAND gate comprises a three input NAND gate.

* * * * *